(12) United States Patent
Keuker et al.

(10) Patent No.: US 8,155,991 B2
(45) Date of Patent: Apr. 10, 2012

(54) SYSTEMS AND METHODS FOR SUPPORTING OBJECT ALLOCATION PROCESSES

(75) Inventors: Stefan Keuker, Cape Town (ZA); Frank Westendorf, Ubstadt-Weiher (DE)

(73) Assignee: SAP AG, Walldorf (DE)

( * ) Notice: Subject to any disclaimer, the term of this patent is extended or adjusted under 35 U.S.C. 154(b) by 1078 days.

(21) Appl. No.: 11/512,272

(22) Filed: Aug. 30, 2006

(65) Prior Publication Data

US 2007/0055974 A1 Mar. 8, 2007

Related U.S. Application Data

(60) Provisional application No. 60/712,088, filed on Aug. 30, 2005.

(51) Int. Cl.
*G06Q 10/00* (2006.01)
(52) U.S. Cl. ........................... 705/7.27; 705/7.12
(58) Field of Classification Search ............... 705/7.12, 705/7.27, 8
See application file for complete search history.

(56) References Cited

U.S. PATENT DOCUMENTS

| 5,918,226 | A  | * | 6/1999 | Tarumi et al. | 1/1 |
| 6,038,541 | A  | * | 3/2000 | Tokuda et al. | 705/8 |
| 2006/0069605 | A1 | * | 3/2006 | Hatoun | 705/9 |

FOREIGN PATENT DOCUMENTS

WO  WO 02/33603  4/2002

OTHER PUBLICATIONS

Image and Worklfor Library: Advanced Workflow Solutions using IBM FlowMark, Marc Hoffman, David Shute, Mike Ebbers, Jan. 1999.*
European Office Action, dated Nov. 9, 2007, issued by the European Patent Office in related foreign application No. EP 06 017 978.5 (6 pages).
Mark Hoffmann et al., "Image and Workflow Library: Advanced Workflow Solutions Using IBM FlowMark," Internet Citation, Jan. 1999, 152 pages.

* cited by examiner

*Primary Examiner* — William Rankins
(74) *Attorney, Agent, or Firm* — Finnegan, Henderson, Farabow, Garrett & Dunner, LLP (57) ABSTRACT

Systems and methods are disclosed for supporting at least one allocation process for an allocation of objects in at least one application by way of an allocation framework pre-configured for the allocation process, with at least one monitoring and control unit and at least one working unit. In one implementation, the allocation process is pre-configured in the allocation framework by presetting process steps and defining their sequence. At least one work stock that can be retrieved via the allocation framework is made available and managed by the working unit for the allocation process to be supported, in which work stock allocation type-specific and application-specific allocation instructions that can be input via the allocation framework or are preset in a rule-based manner, are filed. In addition, the at least one pre-configured allocation process to be supported in the allocation framework may be instantiated and started by the working unit of the allocation framework, wherein in order to carry out the allocation process the associated work stock is processed fully automatically, partly automatically or manually as desired, and if necessary the application connected via an interface predetermined by the allocation framework is automatically addressed for performing allocation actions associated with the respective allocation process steps.

26 Claims, 2 Drawing Sheets

Figure 1

Figure 2

SYSTEMS AND METHODS FOR SUPPORTING OBJECT ALLOCATION PROCESSES

RELATED APPLICATION

Under provisions of 35 U.S.C. §119(e), this Application claims the benefit of U.S. Provisional Application No. 60/712,088, filed Aug. 30, 2005, which is expressly incorporated herein by reference to its entirety.

TECHNICAL FIELD

The present invention generally relates to the field of data processing and to object allocations in systems and methods that manage objects, such as, for example, in the area of inventory allocations or in claim transfers and liability transfers. More particularly, and without limitation, the invention relates to systems and methods for supporting object allocation processes, including processes for producing object relationships.

BACKGROUND INFORMATION

In various areas and for a number of problems and tasks in various applications, it is often the case that allocations between objects to be managed by the corresponding applications have to be changed. Thus, the situation may for example arise in the area of insurance, e.g., on account of the retirement or death of an insurance writer, that the business objects managed on the part of this insurance writer have to be transferred to one or more other insurance writers; in this case, it would be an inventory transfer that has to be effected. In the area of insurance, it is similarly possible that a transfer of claims and/or liability from a commission contract to one or more other commission contracts becomes necessary on account of specific events. Similar scenarios are also conceivable in other fields of business, which are always associated with a necessary object allocation.

There are a number of factors that can influence an allocation process to be carried out and that can therefore greatly increase its complexity. In the environment of a change of object relationships further process steps may, for example, become necessary. These may include preparatory, follow-up, fault-handling or checking activities in relation to object allocations. Thus, it may for example happen that in the course of an allocation process, checks by one or more clerks or officials, the drafting or amendments of a contract, such as for example a commission contract, or the printout of correspondence are necessary. Preparatory, allocatory, checking, fault-handling and follow-up steps in an allocation process need not in this connection necessarily take place sequentially, and there may be dependencies between process steps. It might for example be desired that an inventory transfer can be carried out only after a successful claim and liability transfer.

An allocation process is also not restricted to an allocation type, such as for example an inventory transfer and a claim and liability transfer, or to an application, and need not be restricted to one system. Instead, various mutually independent systems may be affected by an allocation process to be carried out or may influence such a process.

An allocation process may contain a number of allocation types and may comprise a number of preparatory, checking, allocatory, fault-handling and follow-up process steps. In addition, complex relationships may exist between the individual allocation process steps. As already explained, a number of various applications possibly implemented on various systems may furthermore be involved in an allocation process. Finally, the number of objects to be allocated, i.e., the allocation volume, may also be very large. All of these factors can greatly increase the complexity of an allocation process, which makes it necessary or desirable to have a system-side support in the implementation of such an allocation process in one or more applications.

SUMMARY OF THE INVENTION

According to one embodiment of the present invention, a process is provided for supporting at least one allocation process for an allocation of objects in at least one application by means of an allocation framework pre-configured for the allocation process with at least one monitoring and control unit and at least one working unit. In this connection, the allocation process may be pre-configured in the allocation framework by presetting process steps and defining the process step sequence. In the process, at least one work stock, retrievable via the allocation framework, is made available and managed by the working unit for the allocation process to be supported, in which are filed allocation instructions specific to the type of allocation and application and that can be input via the allocation framework or can be preset in a rule-based manner. In addition, the at least one pre-configured allocation process to be supported in the allocation framework may be instantiated and started by the working unit of the allocation framework, wherein in order to carry out the allocation process the associated work stock is processed fully automatically, partly automatically or manually as desired. If necessary, the application that manages the affected objects is addressed for the conversion of allocation actions associated with the respective allocation process steps. The application is connected within the scope of the configuration of the allocation framework via a predetermined interface.

In another embodiment, a process-specific workflow pattern may be generated and made available by the allocation framework for the completely automatic and/or partly automatic processing of the allocation process, allocated to the allocation process, and started for the implementation of the allocation process.

The allocation instructions in the work stock may be input manually or supplied in a rule-based manner in the background by the application affected by the allocation process. Specific allocation scenarios can also be created with the aid of allocation rules. The allocation instructions are then the result of a scenario-specific selection of objects and target objects.

A workflow pattern should be understood in this case to mean quite generally a type of flow diagram that can be processed either by manual inputting and/or automatically. The processing takes place with reference to the work stock that is made available, in accordance with the definition of the affected allocation process.

An allocation process may be understood within the context of the present invention to mean a totality of all preparatory, checking, follow-up, allocatory, fault-handling, follow-up and/or other process steps that are necessary for the allocation of objects from an actual allocation to new target objects. The definition of an allocation process includes the presetting of process steps and their mutual dependencies. The definition of a process step includes the presetting of the definition of the work stock on which the step is to operate. The definition of the work stock includes the presetting of the allocation type that defines, according to their type, the objects participating in the object allocation.

In one embodiment, an allocation type defines so-called allocation type classes via which object allocations can be undertaken in the connected application by means of an allocation framework consistent with the present invention. An allocation type class may correspond to a so-called "plug" into the application connected to the allocation framework. The allocation type class in this connection belongs technically to the connected application, although it implements an interface predetermined by the allocation framework. The interface may describe the methods and their signature that the connected application has to implement in order to be able to undertake object allocations by means of the allocation framework. Examples of allocation types are so-called inventory transfers (IT), such as, for example, a transfer of a group of insurance contracts to a clerk processing this group, and so-called claim and liability transfers (CLT), such as, for example, a transfer of claims from a commission contract to one or more other commission contracts.

The work stock made available on the part of the allocation framework is understood to mean a totality of all so-called allocation groups, so-called allocation stipulations, and so-called allocation instructions allocating process steps in the allocation process. An allocation instruction is in this connection the smallest element of the work stock, and is a stipulation concerning the allocation of an object from an actual allocation to a possibly new target object. A target object is an object to which an object is to be allocated in an allocation instruction. A so-called allocation stipulation is a grouping of allocation instructions. An allocation stipulation contains as a rule a selection stipulation for objects, a selection stipulation for target objects, and so-called allocation parameters. Finally, a so-called allocation group is a group of technically dependent allocation stipulations. If necessary, the allocation group holds objects of all associated allocation stipulations that have not been assigned to a target object. Within an allocation group, objects can be shifted between allocation stipulations.

Allocating process steps are those steps in an allocation process that are involved in an allocation of objects. An allocating process step executes allocation instructions in the associated work stock. The work stock is in this connection created for a selected allocation type.

In another embodiment, a process according to the invention is provided where it is envisaged that allocation process steps may be processed fully automatically, partly automatically or manually as desired, and if necessary, the application connected via an interface is automatically addressed for the conversion of allocation actions associated with the respective allocation process steps.

The application that utilizes the allocation framework may equip its allocation-relevant application logic with standardized capabilities and makes these known to the allocation framework. The allocation framework provides an interface description in the sense of an interface for the use of its services. The connected application that would like to make use of the services must implement the interface in the so-called allocation type class, also termed application plug.

The work stock that is made available and managed on the part of the allocation framework may include the allocation instructions according to which objects are to be related to target objects. After the successful implementation of an allocation instruction, which is performed by an allocating process step or by manual initiation of the processing of the work stock with the aid of the application connected via the interface, the selected object is allocated to the required target object. The work stock is configured specifically according to allocation type and application and may, on account of a relevant event in the application, be created either by the working unit of the allocation framework "in the background," or by manual inputting in a dialogue still to be discussed in more detail hereinafter.

In another embodiment, a process is provided where the work stock may be created in whole or in part by the allocation framework and is transferred as work stock to the allocation process.

Within the context of the present invention, a work stock is understood to be a structure in which allocation instructions between objects and target objects are filed for a specific allocation type. Allocation instructions are assembled in the work stock into allocation stipulations. Those in turn are present in allocation groups. The work stock contains head information, which includes, for example, the description in the form of an abbreviated text. Also, it can be documented in corresponding fields who created the work stock and when, and who last altered the work stock and when.

The allocation process steps of the allocation process may refer in each case to the work stock on which a corresponding allocation activity is to be carried out. The work stock itself may also exist without an allocation process associated with it.

The allocation instructions of the work stock may contain information for creating or diverting relationships between objects of different types. In one embodiment, an allocation instruction consists of an identification number (ID) of the object to which the allocation instruction refers, the identification number of the object to which the object relationship exists at that time, a so-called source object, a field for specifying properties of the actual relationship, and the identification number of the object with which the new relationship is to be formed (the so-called target object).

It may furthermore be envisaged to create an allocation instruction that is time and space dependent in its specialist validity, since objects can, depending on the allocation type, form time-limited relationships with other objects.

It may furthermore be envisaged to carry out a shared allocation, such as, for example, when a claim is to be allocated to several contracts. Responsibility for checking consistency with respect to the details of validity time limits and proportional values is borne by the application for which the allocation is to be carried out and which is responsible for the allocation.

It may moreover be envisaged that for each allocation instruction parameters can be filed that control the processing of the change in relationship. If, for example, identical parameters are utilized by a plurality of allocation instructions, then the parameter information need be predetermined only once in this way.

In addition, a security facility can be provided, according to which an object cannot simultaneously obtain in different work stocks a status "to be processed", or a similar status that does not refer to a final processing. If an attempt is made to allocate one and the same object to a plurality of work stocks in such a status, provisions may be made automatically to refuse such an allocation.

In order to permit a parallel processing of allocation instructions, it may be envisaged to make the allocation instructions of a work stock selected for the processing divisible into so-called work packets.

During a processing of the work stock the allocation framework for each allocation instruction may hold a protocol, a so-called application log. A clarification of a system state can be accomplished in this way after allocation.

It may be envisaged that non-processed allocation instructions of a work stock can be erased. It may be possible to add new allocation instructions to a work stock that has not been completely processed. Furthermore, it should be possible by manual input also to execute allocation instructions filed in the work stock.

In a further possible embodiment, a process according to the invention is provided where a dynamic user interface, in particular a graphical user interface, is made available by the allocation framework, via which process-dependent and process status-dependent instructions, queries and/or inputs can be executed in the dialogue.

It is possible to input an allocation scenario via the user interface and to apply thus a scenario-specific configuration of the allocation process and of the work stock. In fact, both the process definition as well as one or more allocation process steps of the allocation process may in this connection include attributes that are dependent on a specific allocation scenario. According to the adjustments made to the work stock definition and possibly depending on the allocation scenario, screen elements of the user interface are assembled that are necessary for an acquisition of the work stock. In this connection, in particular screen elements for a selection of objects and target objects as well as for a presetting of allocation parameters are involved. Data and metadata of the objects associated with the allocation are supplied by the connected application independently of the scenario to the allocation framework.

The allocation framework receives object data from the connected application and dynamically displays these via the user interface.

In a further embodiment, a process is provided where it is envisaged that a protocol on the progression of the allocation process can be dynamically managed and displayed via the allocation framework when performing the allocation process.

It may furthermore be envisaged that a protocol on the status of the processing of the process steps and of the work stock can be managed and displayed via the allocation framework when performing the allocation process.

In a further embodiment, options may be dynamically provided via the user interface that is made available, so as to be able to at least partly create, process, display and release the work stock by manual inputting.

The work stock for object allocation that can be transferred to the allocation process may in a further embodiment be displayed in the user interface.

It is possible to create an allocation instruction in the following dialogue steps: object selection, target object selection and specification of the allocation parameters. The allocation instruction contains in this respect the instruction to create a specific relationship between an object and a target object.

Such a procedure is less suitable for an inventory regrouping on account of for example restructuring, since in this case many partial inventories have to be re-sorted into many new partial inventories. A manual acquisition of all the necessary allocation instructions would be extremely complicated and as a rule would not be able to be carried out in an error-free manner. It should therefore be possible also to be able to form mechanically in a rule-based manner a work stock consisting of the associated allocation instructions. In this connection, a possibility or an option may be provided in the allocation framework so as to be able to configure allocation rules.

A manual creation and maintenance of the work stock may be effected via the user interface that is made available on the part of the allocation framework. A work stock may be created by manual inputting or alternatively, as already mentioned, "in the dark", in such a way that first of all only objects are contained that are to enter into a new object relationship like their current allocation. All objects not yet allocated in this way to a target object may in this connection be held as open allocation stock at the level of the allocation group. Objects can be transferred from the allocation stock thereby created to allocation instructions. Only when the open allocation stock no longer contains any objects is the allocation group completely defined.

In a further embodiment, a process according to the invention is provided where a graphical user interface subdivided into a plurality of screen elements corresponding to a hierarchical structure forming the basis of the work stock may be made available for the creation, processing and display of the work stock.

In this connection, it may be envisaged to make available a first screen element for navigation, a second screen element for the creation, processing and display of an allocation group, a third screen element for the creation, processing and display of one or more allocation stipulations associated with the allocation group, and a fourth screen element for the creation, processing and display of one or more allocation instructions associated in each case with the allocation stipulation or stipulations.

An access to the display of the work stock on the user interface may in this connection be regulated via an entry window, in which, for example, an identification of the work stock is requested.

When designing a work stock and/or when designing an allocation process an input of a so-called allocation scenario may be possible via the user interface and, if necessary, context information regarding the work stock to be created may be given. The allocation scenario describes circumstances and details under which an allocation process is carried out. The allocation scenario may be used, for example, for a specialization of the configuration of the allocation process or of at least one of the allocation process steps of the allocation process. For the runtime, for example, either the application and/or a user can decide via the user interface which allocation scenario is present. During and after initiation of the allocation process the allocation scenario serves for a further qualification of the allocation process context.

The first screen element for the navigation may in turn consist of a plurality of elements, in which in addition to a graphical illustration of the structure of the work stock the possibility also exists of being able to search for objects in the work stock or to retrieve the context information of the work stock. By selecting displayed nodes, the further three screen elements relating to the allocation groups, allocation stipulations and allocation instructions can be addressed via the graphical illustration of the structure of the work stock.

In the second screen element for the creation, processing and display of an allocation group, there may likewise be provided a plurality of functions that can be implemented as regards the allocation group. This may be, for example, an insertion or deletion of an allocation group, the execution of the allocation instructions defined by the allocation group, or the cancellation of the implemented object allocation.

In the third screen element for the creation, processing and display of one or more allocation stipulations associated with the allocation group, there may likewise be provided a plurality of functions via which an allocation stipulation can be processed. This may be, for example, the creation or deletion of an allocation stipulation, the selection of source and target objects, and/or a creation of allocation instructions. An auxiliary function and a function for the initialization of a screen region for an allocation stipulation may also be provided.

The fourth element for the creation, processing and display of allocation instructions may exhibit a range of functionalities, with the aid of which a range of information forming the basis of a corresponding allocation instruction can be retrieved. Thus, for example, a processing protocol for the allocation instruction can be queried. Furthermore, the object corresponding to the new allocation can be navigated. In the case of a claim and liability transfer this may be, for example, a transfer document.

A work stock can be configured in terms of its definition with regard to an allocation type for which the work stock is to be used, and with regard to one or more user interfaces with which the work stock can be operated and displayed. In addition, it is conceivable to configure a work stock as regards its properties so that, in addition to the allocation type, a pre-determinable allocation scenario is also taken as a basis or is taken into account. Depending on an allocation scenario, different user interfaces may be employed, such as, for example, for selecting objects and target objects and for presetting allocation parameters. In addition, a rule-based creation can be configured.

In another embodiment, it may be envisaged that one or more allocation process steps can be manually incorporated or implemented in an ad hoc manner via the user interface.

The allocation framework provides for the configuration of the definition of allocation processes. This is connected with a definition of allocation process steps and the establishment of dependencies between the allocation process steps. Dependencies may in this connection be described by so-called precursor-successor relationships. The configuration of process step properties may include, for example, an establishment of a release process that in the allocation process requires the release of an allocation process step. It may be envisaged in this connection that executed entries are held by the allocation framework in a corresponding storage unit.

In this connection, it is possible that the implementation of the allocation process is initiated in the dialogue via the user interface and thus a process-specific workflow is started if necessary.

For the definition of an allocation process, the allocation framework can make available a workflow pattern by means of standardized methods. These methods can create a workflow pattern on an ad hoc basis or can fully or partly generate a workflow pattern in the background. Such a procedure may be provided, for example, if the configuration forming the basis of the definition of the allocation process is sufficient for it to form, as a data model, the basis of a workflow generation. In the case where process demands exist that cannot be formed by the data model on which the allocation process definition is based, or if an automatic creation of a workflow pattern for this purpose is not fully possible, then there may be the possibility of generating and manually refining a workflow pattern.

It is conceivable to transfer the processing of an allocation process and the workflow tasks associated therewith to an external control unit coupled to the allocation framework. Accordingly, the allocation process is automatically sped up by the external control unit according to the definition of the generated workflow pattern.

An overtaking of the automatic allocation process control undertaken in this way by a manual implementation of object allocations can be intercepted if an application checks the allowability of the instruction at the time of an object allocation. If an object, when carrying out the allocation instruction, does not correspond to the source object of the instruction, the allocation should be rejected. Optionally, a connected application could check whether the existing object allocation already corresponds to the allocation instruction. In this case, the allocation instruction would not have to be refused, but could be flagged up as "already converted".

Apart from the already mentioned automatic control of the process implementation by means of an external control unit connected to the allocation framework, a manual control of the implementation of the allocation process is also possible, i.e., an allocation process can be manually processed via the user interface. With the manual implementation of an allocation process a user can, via inputs at the user interface, initiate himself allocation process steps and check processing results. Where an allocation process is, however, already automatically controlled, it may be envisaged that in this case a manual control by a user is no longer possible. In these circumstances, there is an option by means of which the automatic control can be terminated before a user can take over the control of the allocation process by manual inputting via the user interface.

In the manual control of an allocation process, a protection may be provided so that a sequence of allocation process steps, such as has been predetermined in the allocation process definition, cannot be violated.

The allocation framework may moreover serve as a supporting tool for allocation processes involving processing of bulk data. For this purpose it may be predetermined in the allocation framework to terminate temporarily the implementation of allocation process steps in the background. Such a background processing may take place in parallel in a performance-optimized manner, i.e., with the best possible utilization of the available resources.

In order to minimize incorrect allocations in the implementation of the allocation process, an option may be provided so as to make the implementation of allocatory process steps dependent on a successful 4i check. A decision as to whether a 4i check is necessary for a specific process step can be made within the context of the process definition. If a 4i check is active, then the work stock for a process step can only be transferred to the processing if a check and release is carried out by up to two further users. To manage the release state, a "release stage" field can be held at the level of the process step. The release stage may in this connection assume various values.

In a further embodiment, a functionalities are provided in the allocation framework, whereby the information and instructions relating to the allocation process can be dynamically communicated to a plurality of affected and/or responsible users. Thus, various users involved in the allocation process and/or interested in this allocation process can be informed as regards the allocation process and/or as regards the allocation process status.

Also, a communication with, for example, several users may be necessary in connection with the aforementioned release. In the course of the allocation process, various users can therefore be contacted by so-called dialogue work items or also manually in order to check the work stock. A release by a first checker may, for example, cause the release stage of the process step to change to a value "one." It may be envisaged that it is not yet possible to process the affected process step in this state. Only after a release by a second checker, by means of which the release stage changes from the value "one" to a value "two," can the processing take place.

In a further embodiment, a process according to the invention is provided where, when carrying out the allocation process via the allocation framework, a protocol concerning the status of the processing of the process steps and of the work stock can be directed and displayed.

It may furthermore be envisaged that when carrying out the allocation process via the allocation framework, a protocol concerning the course of the allocation process can be directed and displayed.

The user interface made available on the part of the allocation framework may be configured so that in addition several various possibilities for a user are provided.

It may be possible via the user interface to initiate the implementation of the allocation process in the dialogue and in addition, if necessary, to start a workflow.

Furthermore, selection criteria for the choice of objects that are to enter into a new relationship, or for the choice of objects with which a relationship is to be entered into, can be inspected and selected via the user interface. The user interface should also permit the presetting of allocation parameters for a processing of allocation instructions.

According to another embodiment, the implementation of the allocation process may be, as already mentioned, initiated via the user interface in the dialogue. In this connection, a choice can be made from allocation processes that are already present in the system.

Individual ad hoc allocations, as well as the bulk allocations, may be made possible via the aforementioned user interface. An ad hoc allocation differs in this connection, for example, from a bulk allocation in that individual objects are not allocated in the process context, but are allocated on explicit request in the dialogue.

In addition to an initiation of an allocation process in the dialogue via the user interface, it may also be possible in another embodiment to initiate the implementation of the allocation process automatically by a specific event in the application. This means that an allocation process is thereby initiated on the system side, i.e., in the dark. For this purpose, it is necessary to implement a so-called allocation process finding, which identifies for the runtime depending on the aforementioned application result and for an allocation process scenario to be transferred, the allocation process to be started in this case. Known rule procedures, for example, may be used for an implementation of such a process finding.

An allocation process to be started "dark" in the case of an application event may now be prepared for implementation by means of the allocation framework. In the allocation process preparation, the objects to be allocated can be determined with the aid of the existing context information of the triggering application event. The allocation scenario at the same time identifies the significance of the context information. In the case of the scenario "technical termination of the commission contract," the context information could, for example, be interpreted as "commission contract." Where possible, suggestions for the allocation to target objects can be made for the selected objects.

In order to protect a work stock against unauthorized access, authorization checks can be carried out for transactions involving the creation, amendment and display of the work stock. In this connection, the authorization check may be carried out against an authorization object with application, process, process step and activity fields provided for this purpose. For a dialogue, processing the work stock can be technically locked at the level of a process step. In this connection, the process step is assumed by users to be the lowest level for the definition of responsibilities. In this way, it can be ensured that alterations at the level of allocation instructions cannot simultaneously be made by various users with the same responsibility.

A locking at the level of an allocation instruction may not sufficient since a work stock can, via the addition of allocation instructions, be altered in such a way by a second user that it no longer meets the requirements of the first user.

When initiating the processing of a work stock in the background, the processing can be locked at the level of work packets. Work packets are in this connection understood to denote an amount of in each case functionally and technically independent subsets of the work stock. Under these circumstances, the same work packet cannot be taken over for more than one process for the processing.

A work stock may also be deleted as long as there are no already successfully operating allocation instructions. Otherwise, a deletion is only possible when all allocation instructions have been processed free of error. All work stocks that contain at least one successfully processed allocation instruction can be archived and then, for example, removed in this way from the allocation framework.

A work stock may, in the interests of documentation, be made archivable. Work stocks of the allocation framework may, as already mentioned, be formed manually or by machine, i.e., in the background. In order to support a further processing of work stocks after their creation, the allocation framework may in addition make available a search function for work stocks. In this connection, it may be envisaged to make a search according to the attributes identifying a work stock or to search through objects in the work stock. Furthermore, it may be envisaged to implement a status trace for elements of the work stock. Status information is made available for a resumption of the processing of a work stock. Moreover, with the aid of the status information, it can be ensured that a source object cannot participate in further relationship changes unless all allocation instructions with which it is involved have been finally processed.

If a work stock for the processing is planned, this may possibly lead to a premature termination due to a system error, or a processing of individual allocation instructions of the work stock ends in errors. Accordingly, it may be envisaged to replan the affected work stock or individual parts in such a way that only elements of the work stock that require a further processing are processed.

In a further embodiment, the possibility is provided via the allocation framework of keeping an application log from the processing at the level of the allocation instruction of the work stock. Thereby, it is possible to display a list of errors of all allocation instructions of the work stock that have actually been initiated but have not been successfully processed.

In another embodiment, the allocation framework may be able to support allocation processes for any arbitrary allocation type. In order to ensure this, the logic of the allocation framework should be clearly separated from that of the application for which the allocation is undertaken. To this end, it may be envisaged to assign generic allocation framework classes that implement the construct of the work stock and its methods. The generic classes have in this connection no understanding of the objects whose relationships are to be altered. They are independent of the allocation types in the allocation process.

In addition to the generic classes, classes are provided that implement the allocation type that is affected in a respective allocation process step. This type of class is, within the context of the present invention, termed an allocation type class. This type of classes recognizes the source object type and target object type of the allocation and understand the context information that the application supplies to an allocation-relevant result, and also the allocation scenario.

Conventions have been agreed for an interaction between the aforementioned generic classes and the allocation type classes. For this purpose, according to one embodiment of the invention, all methods and their respective parameters that have to be developed for an execution of object allocations within the scope of the allocation framework may be combined in an interface type of the allocation framework. That interface type is implemented by the allocation type classes. In the implementation, the methods and parameters are, as already mentioned, developed for the allocation type to be considered. The corresponding allocation type class is in turn implemented in the connected application so that, when carrying out the allocation process, the allocation framework together with the connected application can communicate via a defined interface that has implemented the allocation type class. This means that the allocation framework communicates with the connected application via an interface defined by the aforementioned interface type.

Additional embodiments of the present invention relate to an allocation framework for supporting at least one allocation process in at least one application. The allocation framework may comprise at least the following elements: a working unit that is able to instantiate the at least one allocation process to be supported, a work stock to prepare for and manage the allocation process and to start the allocation process, a control and monitoring unit that is able to control an implementation of the allocation process, and an interface via which the application is connected to the allocation framework and can communicate with said allocation framework.

The allocation framework may additionally include a storage unit that is capable of storing in a retrievable manner configuration data of at least one allocation process and at least one work stock.

In a further embodiment, the allocation framework may make available a dynamic user interface, in particular a graphical user interface, via which process-dependent and process status-dependent instructions, queries and/or inputs can be implemented in the dialogue. In this connection, it is possible for process-dependent and process status-dependent dynamic options to be provided via the user interface in order to be able at least in part to create, process, display and release the work stock by manual inputting. The processing of the work stock involves, for example, an alteration or a deletion of allocation instructions.

In a further embodiment according to the invention, a graphical user interface subdivided into a plurality of screen elements corresponding to a hierarchical structure forming the basis of the work stock can be made available for the creation, processing and display of the work stock. In this connection, it is possible to make available a first screen element for navigation, a second screen element for the creation, processing and display of an allocation group, a third screen element for the creation, processing and display of an allocation stipulation associated with the allocation group, and a fourth screen element for the creation, processing and display of an allocation instruction associated with the at least one stipulation.

Moreover, it is conceivable to provide functionalities in the allocation framework, whereby information and instructions relating to the allocation process can be dynamically communicated to several affected and/or responsible users of the allocation framework.

Apart from this, embodiments of the present invention further relate to computer programs with program coding means that are suitable for carrying out processes according to the invention when the computer program runs on or is executed by a computer system or processor.

Embodiments of the present invention also relate to computer program products on which a computer program including program coding means is stored, which are suitable for carrying out processes according to the invention when the computer program runs on a computer.

Further advantages and modifications of the invention follow from the description and the accompanying drawings.

It is understood that the features mentioned hereinbefore and those that are still to be explained hereinafter may be employed not only in the combination specified in each case, but also in other combinations or in isolation without departing from the scope of the present invention.

BRIEF DESCRIPTION OF THE DRAWINGS

The accompanying drawings, which are incorporated in and constitute a part of this specification, illustrate several aspects of the invention and, together with the description, serve to explain the principles of the invention. In the drawings.

DETAILED DESCRIPTION OF THE DRAWINGS

Figure 1:
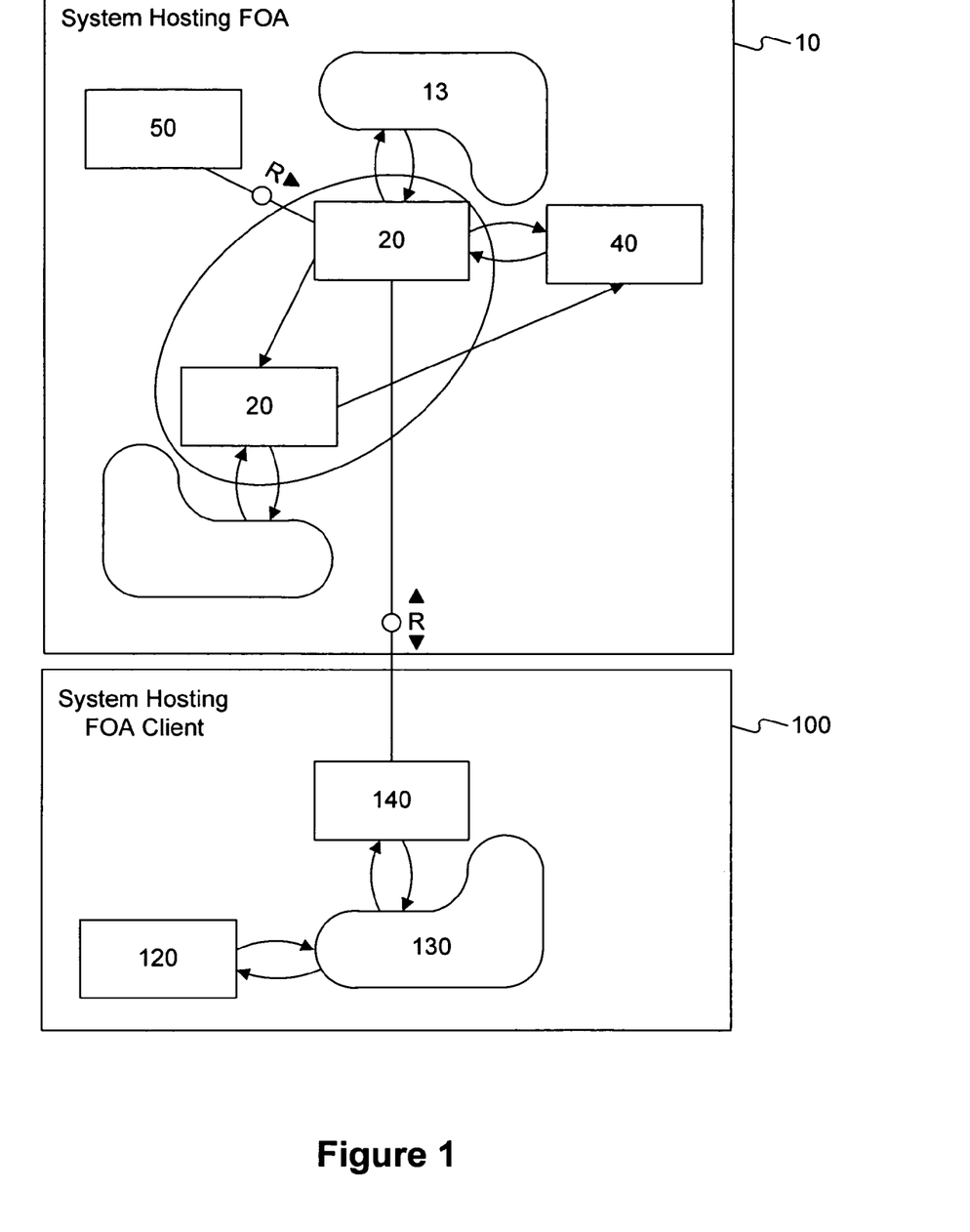
FIG. 1 is a diagrammatic representation of an exemplary system architecture in which an embodiment of an allocation framework consistent with the present invention is embedded.

FIG. 1 is an exemplary system architecture including a first system 10 (e.g., a system hosting FOA) in which an embodiment of an allocation framework 20 according to the invention is embedded, and including a second system 100 (e.g., a system hosting FOA client) that includes an application 120 for which an allocation process is to be carried out with the aid of the allocation framework 20. The application 120 includes objects 130 that are to be allocated or whose allocation is to be changed. The application 120 communicates with the application framework 20 via a defined interface. The allocation framework 20 is able to support allocation processes for any type of allocation. In order to guarantee this, the logic of the allocation framework 20 should be clearly separated from that of the application 120 for which the allocation process is to be carried out.

For the preparation and implementation of object allocations for objects 130 of the application 120, the connected application 120 may implement an allocation type class, which here for the purposes of illustration is termed an allocation framework plug-in 140. The allocation framework 20 communicates with the connected application 120 via this interface, which implements the corresponding allocation type class.

The allocation framework 20 makes available a work stock 13 in which are filed allocation instructions that relate objects to target objects and that are characteristic of the allocation process to be carried out on the part of the application 120. After executing an allocation instruction that is filed in the work stock 13, and which is implemented with the aid of the connected application 120, the corresponding objects are allocated to the target objects. The work stock 13 may, on account of a relevant event in the application 120, be created by a working unit of the allocation framework 20 in the background or manually by a user in dialogue with the allocation framework 20.

Before an allocation process can be carried out with the support of the allocation framework 20, the allocation process to be supported must be configured in the allocation framework 20 and instantiated. In this connection, allocation process steps may be defined and their sequence and mutual dependencies adjusted. In one embodiment, the definition of an allocation process comprises establishing which steps are to run in the process, which dependencies exist between the process steps, and what is in each case the subject matter of the step. With the aid of the allocation framework 20, it is now regulated in a controllable manner when carrying out the allocation process in which previously defined sequence the allocation process steps are carried out with the aid of the allocation instructions filed in the work stock 13. In this connection, there may also be provided an external module 40 coupled to the allocation framework 20, which module controls or speeds up a processing of a process-specific workflow that is optionally made available on the part of the allocation framework 20 with workflow tasks. In addition to such a control the workflow tasks may, however, also be carried out by manual inputting via a suitable user interface of the allocation framework 20.

A further module 50 may in addition be coupled to the allocation framework, which module can be used if an allocation process is to be started depending on an event in the connected application 120. By using this module 50, it is left to the user which conditions have to be fulfilled for an implementation of an allocation process. In the module 50, the user can make a decision as to which allocation scenario exists in the case where an application event occurs.

Presetting an allocation scenario is important for the allocation process preparation since the allocation scenario describes circumstances under which an allocation process is to be carried out. The allocation scenario is used for a specialization of the configuration of the allocation type and for a scenario-specific configuration of the allocation process. The runtime the application 120 may decide via the external module 50 or the user decides in a suitable user interface of the allocation framework 20 which scenario is present.

Figure 2:
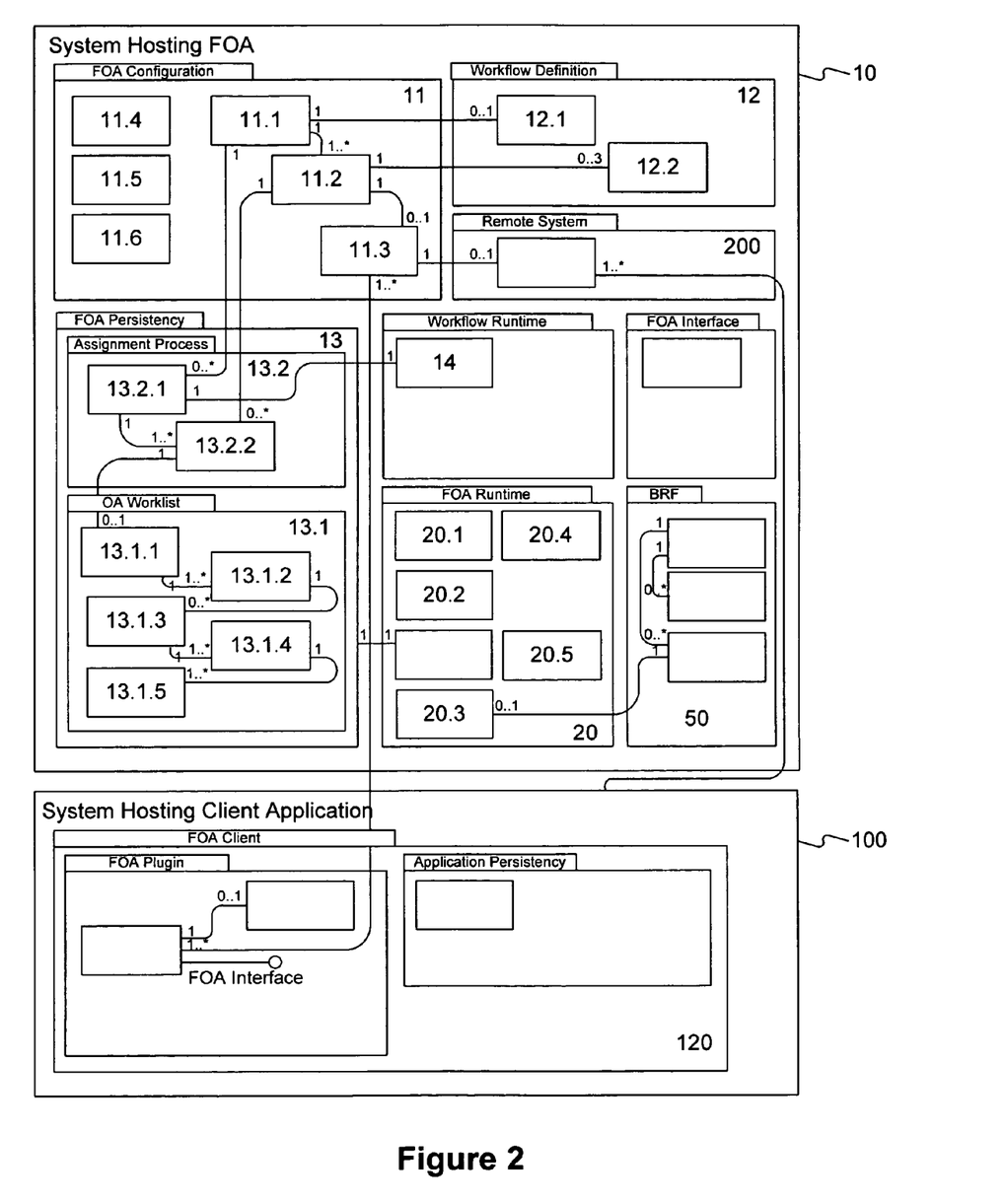
FIG. 2 is a diagrammatic representation, in more detail as compared to FIG. 1, of another exemplary system architecture in which an embodiment of an allocation framework consistent with the present invention is embedded.

FIG. 2 shows a detailed exemplary internal architecture of an embodiment of an allocation framework, according to another embodiment of the present invention. The allocation framework is in turn embedded in a system 10 (e.g., a system hosting FOA). In addition, an application 120 (e.g., a FOA client) is illustrated, which is embedded in a further system accessible to a user, i.e., in a client 100 (e.g., a system hosting client application).

In the system 10 embedding the application framework, the individual function blocks of the allocation framework may be broken down, as shown in the example of FIG. 2. A block 11 (e.g., a FOA configuration) is shown, which describes a configuration of the allocation framework. Allocation processes may in general be configured within the allocation framework. The definition of an allocation process 11.1 includes in this connection a definition of the allocation process steps (11.2) involved in the allocation process, i.e., in general what steps take place in the process, what dependencies exist between the process steps, and what the subject matter of the step is in each case. Furthermore, an allocation type is defined in the definition of the allocation process (11.3). In addition to the definition of the allocation process, in configuring the allocation framework object allocation rules (11.4), a report on the allocation selection (11.5) and an allocation scenario (11.6) are also filed. In a function block 12 (e.g., a Workflow Definition) it is further shown that a workflow pattern (12.1) is created at the level of the allocation process or rather of the definition of the allocation process, and a workflow task (12.2) allocated in each case to each allocation process step is created at the level of the defined allocation process steps. Such a process-specific workflow pattern with workflow tasks is made available on the part of the allocation framework and serves for the controlled processing and execution of the allocation process to be supported.

A further functional component 13 (e.g., a FOA persistency) comprises and describes the work stock made available on the part of the allocation framework and the individual components contained in this work stock. The work stock 13.1 (e.g., a OA Worklist) has a hierarchical structure. The work stock is identified in a work stock head 13.1.1, i.e., a context information, for example, is made available. In a next hierarchy stage are contained the allocation groups 13.1.2, whose allocation groups elements 13.1.3 comprise allocation stipulations 13.1.4 which in turn comprise allocation instructions 13.1.5 that are to be regarded as the smallest unit within the work stock 13.1. In addition, the function module 13 describes in a module 13.2 (e.g., an Assignment Process) the components from which the allocation process is composed. A first component 13.2.1, a so-called allocation process instantiate, specifies on the basis of the allocation process definition and of a current work object to be processed, a structure forming the basis of the allocation process. In a second component 13.2.2, a so-called allocation process instantiate the allocation process steps are specified having regard to the allocation process step definition 11.2 and with the aid of the allocation instructions filed in the work stock 13.1. With the aid of this component 13, the allocation process is now structurally made ready so that, as is described by a further component 14 (e.g., a Workflow Runtime), it can be processed and operate.

The further component 20 (e.g., a FOA Runtime) may describe through individual components specified here the actual operation of the allocation process. In this connection, a working unit 20.1, a monitoring and control unit 20.2 and the work stock 13.2 are made available on the part of the allocation framework. Furthermore, during the operation of the allocation process, a suitable user interface may be made available to a user on the part of the allocation framework, via which the user can actively control, monitor and influence the operation. A further component 20.5 is provided in order to manage a protocol providing information on the operation of the allocation process. A coupling of an external function module, which is embedded in the same system as the allocation framework, is possible via a further component 20.3. Moreover, for example, rules can be set as to when and by which event the allocation process is to be automatically started, which is described by the component 50 (e.g., a BRF).

An application 120 embedded in the system 100 accessible to a user may make available an allocation framework plug-in for communication with the allocation framework, which encapsulates the application logic for a preparation and execution of an object allocation desired and to be implemented on the part of the application. The allocation framework plugin may describe an implementation of an allocation type class necessary for the preparation and implementation of the allocation process, in particular for the configuration of the allocation type, the allocation type class specifically describing the procedure in the allocation framework that is to be carried out in the application. Furthermore, the application 120, which is here identified as an allocation framework client, comprises one or more allocation objects that are actually to be allocated by the allocation process. The allocation framework may communicate with the connected application 120 via a defined interface 200 (e.g., a Remote System).

An example of a possible allocation scenario that can be handled by a process according to one embodiment of the present invention is described hereinafter.

Starting from the problem already mentioned above with a claim and liability transfer in the insurance sector, the special case of "withdrawal of a commission contract partner" will be discussed briefly. Assume, Person A and Person B are associated in a partnership to sell policies of an insurance company. A is married and has two children; A subsequently dies. The clerk dealing with the case establishes that A's widow is entitled to claim. The clerk contacts the department dealing with commission contracts for A's contract, makes a note of the withdrawal date and reasons for withdrawal "001 death, surviving widow entitled to claim," terminates the contract legally, and secures the commission contract with the effected changes.

Starting from an allocation scenario "withdrawal of a commission contract partner," an allocation process to be carried out with the aid of an embodiment of an allocation framework according to the invention can be described as follows. With the technical termination of the commission contract, for example, on account of the death of the commission contract partner, a rule filed in the allocation framework is triggered, via which it is established whether and which consequential activities are associated with the termination of the commission contract. With the aid of the triggering event "death," the allocation framework can establish that a specific allocation process "death of the agent" has to be carried out. The allocation framework moreover decides on the basis of further context information that the allocation scenario "death of the agent with widow entitled to claim" exists. The allocation process is now started on the basis of these facts. The allocation framework reads the definition of the allocation process "death of the agent" and establishes that, according to the definition of the allocation process, a claim and liability transfer and an inventory transfer have to be carried out in sequence. The allocation framework now instantiates the allocation process and, connected therewith, a new work stock in the allocation scenario "death of the agent with widow entitled to claim." The allocation framework in addition prepares the allocation process step "claim and liability transfer." Successive allocation stipulations are now created consisting of selection stipulations of claims to be transferred, the contracts received in each case, and the associated allocation parameters. This is possible for the allocation framework only by using corresponding logic of the allocation type class implementing the claim and liability transfer. In a first allocation stipulation, a selection stipulation for choosing claims to be transferred is created, for example, from the context information "commission contract of the senior partner." For example, the selection stipulation may simply consist of the commission contract number of the senior partner. From the context information "commission contract of B," and in particular also in connection with the reason for withdrawal and the allocation scenario "death of the agent with widow entitled to claim," an allocation instruction "50% claims remain with the widow" can be identified. A first allocation instruction is created in this way. Since, however, for example the selection resulted in a variant that included, apart from the transfer to the widow in an amount of 50%, also a transfer of the remaining claim to other agents, a further allocation stipulation has to be created. At the same time it is then established, for example, that according to the commission contract the senior partner was, at the time of his death, a member of a partnership. The termination agreement of the partnership now states, for example, that all claims of the senior partner are to be transferred to the junior partner when the agreement is terminated. The commission contract number of the junior partner is therefore used as a selection stipulation for choosing receiving contracts. For this reason, 50% of the claim for the claim transfer and 100% of the liability transfer are passed to the junior partner. A further allocation stipulation is thereby created.

According to the definition of the allocation process "death of the agent," an inventory transfer is also necessary after the claim and liability transfer. The allocation framework therefore makes available in a next step the process step "inventory transfer". Selection possibilities for segments in "death of the agent", i.e., for example, groups of insurance contracts processed on the part of the deceased agent, as well as allocation objects, such as, for example, in this case commission contracts, follow from the definition of the process step "inventory transfer." Both the selection of segments as well as the selection of allocation objects in question may in this connection be effected by specifying respective commission contract numbers. A corresponding creation of allocation stipulations consisting of selection stipulations of segments to be transferred, the contracts received in each case and parameters for the transfer is made possible by using the allocation type class, which implements the inventory transfer.

After completing the allocation stipulations for the claim and liability transfer as well as for the inventory transfer, the work stock associated with the allocation process "death of the agent" in the specific allocation scenario "death of the agent with widow entitled to claim" is created and can be protected in a corresponding databank.

By specifying the work stock, a process-specific workflow allocated to the allocation process can now, for example, be started on the part of the working unit of the allocation framework, in the course of which the allocation stipulations filed in the work stock can be successively processed.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention. Moreover, aspects and features of the invention may be implemented through any suitable combinations of hardware, software, and/or firmware.

It is intended, therefore, that the specification and examples be considered as exemplary only, with a true scope and spirit of the invention being indicated by the following claims and their full scope of equivalents.

What is claimed is:

1. A computer-implemented method for supporting at least one allocation process for an allocation of objects in at least one application using an allocation framework pre-configured for the allocation process with at least one monitoring and control unit and at least one working unit, wherein in the allocation framework the allocation process is pre-configured by presetting process steps and defining their sequence, the method comprising:

retrieving a work stock via the allocation framework through the working unit to the allocation process to be supported;

managing the work stock, the work stock comprising at least one allocation group, each allocation group comprising a grouping of allocation stipulations, each allocation stipulation comprising at least one allocation instruction for the allocation of an object to a target object, wherein managing the work stock comprises receiving input through a dynamic user interface to enter process-dependent and process status-dependent specific instructions;

instantiating, with a processor, the at least one allocation process to be supported which is pre-configured in the allocation framework and starting the at least one allocation process by the working unit of the allocation framework; and processing, with a processor, the associated work stock in order to carry out the allocation process automatically, partly automatically or manually as desired, wherein processing the work stock comprises determining an allocation process status and, based on the determined allocation process status, implementing the at least one allocation instruction to allocate the object to the target object.

2. The method according to claim 1, further comprising automatically communicating with the application managing the objects and connected via an interface predetermined by the allocation framework in order to perform allocation actions associated with the respective allocation process steps.

3. The method according to claim 1, wherein for the completely automatic and/or partly automatic processing of the allocation process, a process-specific workflow pattern is generated and made available by the allocation framework, is allocated to the allocation process, and is started for the implementation of the allocation process.

4. The method according to claim 1, wherein the work stock is created wholly or in part in a rule-based manner by the allocation framework and is transferred as work stock to the allocation process.

5. The method according to claim 1, wherein an allocation scenario is input via the dynamic user interface and, therewith, a scenario-specific configuration of the work stock and of the allocation process is used.

6. The method according to claim 1, wherein the allocation process is initiated via the dynamic user interface and, thus, the allocation process is started.

7. The method according to claim 1, wherein the allocation process is automatically initiated by a specific event in the application and, thus, the allocation process is started.

8. The method according to claim 1, wherein the process steps for the allocation process can be manually planned or carried out on an ad hoc basis via the dynamic user interface.

9. The method according to claim 1, further comprising providing process-dependent and process status-dependent dynamic options via the dynamic user interface, so as to enable a user to at least in part to create, process, display and release the work stock by manual inputting.

10. The method according to claim 9, wherein the dynamic user interface comprises a graphical user interface, the graphical user interface being subdivided into a plurality of screen elements corresponding to a hierarchical structure on which the work stock is based, and is made available for the creation, processing and display of the work stock.

11. The method according to claim 10, wherein a first screen element is made available for navigation, a second screen element is made available for the creation, processing and display of an allocation group, a third screen element is made available for the creation, processing and display of one or more allocation stipulations associated with the allocation group, and a fourth screen element is made available for the creation, processing and display of one or more allocation instructions associated in each case with the allocation stipulation or stipulations.

12. The method according to claim 11, wherein the third screen element includes configurable elements for presetting selection criteria for a selection of objects and for presetting allocation parameters.

13. The method according to claim 11, wherein the fourth screen element is dynamically displayed according to metadata issued by the application and describing the objects.

14. The method according to claim 1, further comprising defining the allocation process steps including establishing the activities to be carried out in conjunction with the respective allocation process steps and a time plan as a sequence of the allocation process steps to be observed when carrying out the allocation process.

15. The method according to claim 1, wherein when carrying out the allocation process a protocol covering the course of the allocation process can be taken and displayed by the allocation framework.

16. The method according to claim 1, wherein when carrying out the allocation process a protocol covering the status of the processing of the process steps and of the work stock can be taken and displayed by the allocation framework.

17. A method according to claim 1, further comprising dynamically communicating information and instructions relating to the allocation process in a controlled manner to a plurality of affected users.

18. A non-transitory computer-readable medium storing instructions for causing a processor to implement an allocation framework for supporting at least one allocation process in at least one application, the allocation framework comprising:

a working unit that instantiates the at least one allocation process to be supported, to make available and manage at least one work stock for the allocation process, and to start the allocation process, the work stock comprising at least one allocation group, each allocation group comprising a grouping of allocation stipulations, each allocation stipulation comprising at least one allocation instruction for the allocation of an object to a target object;

a control and monitoring unit for controlling an implementation of the allocation process, wherein controlling the implementation comprises determining an allocation process status, and implementing the at least one allocation instruction to allocate the object to the target object; and a dynamic user interface via which the application is connected to the allocation framework and communicates with the allocation framework, wherein the dynamic user interface is adapted to receive input to enter process-dependent and process status-dependent specific instructions.

19. The allocation framework according to claim 18, wherein the dynamic user interface comprises a graphical user interface, via which process-dependent and process status-dependent instructions, queries and/or inputs can be executed.

20. The allocation framework according to claim 19, wherein process-dependent and process status-dependent dynamic options can be provided via the user interface so as to enable a user to at least in part to create, process, display and release the work stock by manual inputting.

21. The allocation framework according to claim 20, wherein the graphical user interface is subdivided into a plurality of screen elements corresponding to a hierarchical structure on which the work stock is based can be made available for the creation, processing and display of the work stock.

22. The allocation framework according to claim 21, wherein a first screen element is made available for navigation, a second screen is made available for the creation, processing and display of an allocation group, a third screen element is made available for the creation, processing and display of an allocation stipulation, and a fourth screen element is made available for the creation, processing and display of allocation instructions.

23. The allocation framework according to claim 18, wherein in the implementation of the allocation process a protocol concerning the status of the processing of the process steps and of the work stock can be taken and displayed by the allocation framework.

24. The allocation framework according to claim 18, wherein in the implementation of the allocation process a protocol concerning the course of the allocation process can be taken and displayed by the allocation framework.

25. The allocation framework according to claim 18, wherein functionalities are provided whereby information and instructions relating to the allocation process can be dynamically communicated in a controlled manner to a plurality of users of the allocation framework.

26. A computer program product including a program instruction stored on a computer readable medium for carrying out the steps of a method according to claim 1 when the program instructions are executed by a processor.

* * * * *